Aug. 11, 1931.  F. W. FRENCH  1,818,315

TRAP

Filed Jan. 11, 1930

Frederick W. French, Inventor

By C. A. Snow & Co.
Attorney

Patented Aug. 11, 1931

1,818,315

UNITED STATES PATENT OFFICE

FREDERICK W. FRENCH, OF OAKLAND, CALIFORNIA

TRAP

Application filed January 11, 1930. Serial No. 420,195.

This invention relates to animal traps especially designed for catching gophers, or other burrowing animals, the primary object of the invention being to provide a pivoted trigger so constructed that an animal that has entered the trap cannot back out of the trap.

Another object of the invention is to provide a trigger which is curved to insure against the animal lifting the trigger by placing its foot under the edge of the trigger.

A still further object of the invention is to provide a trap which will be free of friction springs, thereby eliminating danger of injuring the hands of the person setting the trap.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
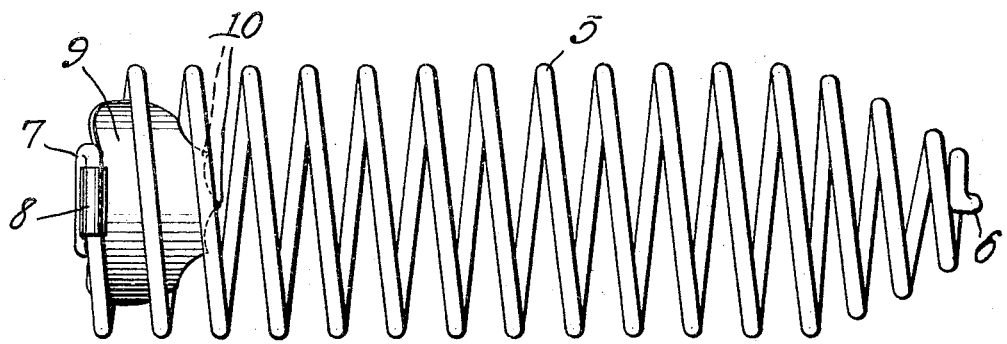
Figure 1 is a plan view of a trap constructed in accordance with the invention.
Figure 2:
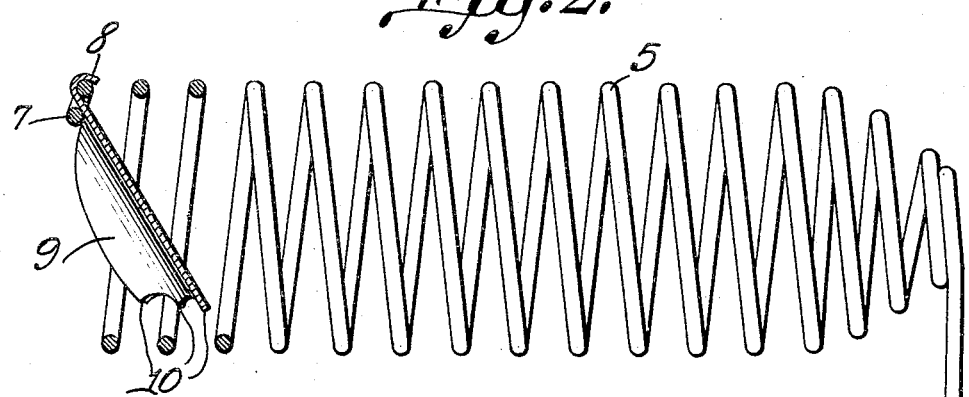
Figure 2 is a side elevational view of the trap, one end thereof being shown in section.
Figure 3:
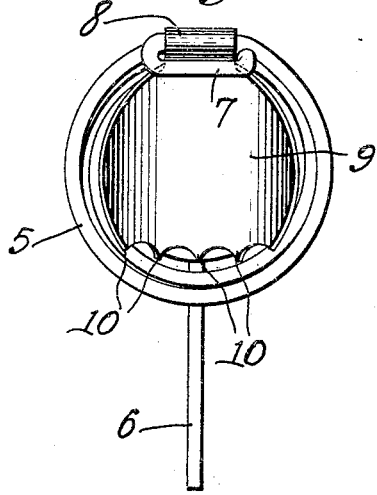
Figure 3 is an end elevational view of the trap.
Figure 4:
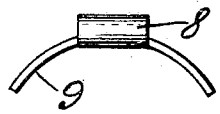
Figure 4 is an end elevational view of the trigger or door at one end of the trap.

Referring to the drawings in detail, the body portion of the trap is indicated generally by the reference character 5, and as shown includes a substantially heavy cylindrical spiral spring, the coils of the body portion tapering at the rear end of the trap to close this end of trap. One end of the length of wire of which the body portion is formed, extends downwardly and provides an anchor arm 6, by means of which the trap is anchored against movement.

The opposite end of the length of wire of which the body portion is formed, is formed into a loop 7 to receive the tongue 8 of the pivoted door or trigger 9, which is constructed of a length of sheet metal material, the free end thereof being formed into a plurality of prongs 10 that are adapted to pierce the animal's back and prevent the animal from backing out of the trap, after it has entered the trap.

The closure or trigger 9 is curved transversely and is so constructed that it will conform to the shape of the back of the animal, and at the same time will provide a closure wherein the side edges thereof will extend forwardly to such positions that it will be impossible for an animal to swing the closure or trigger to its open position, by passing his paw behind the door, or around one edge thereof.

In the use of the device, the trap is positioned in a runway or tunnel formed by the animal, so that the animal in passing through the tunnel, must pass into the trap where it will be caught.

I claim:

A trap comprising a body portion constructed of a length of wire spirally formed, a loop formed at one end of the body portion, a door having a tongue, said tongue being extended through the loop and bent around one side of the loop to pivotally support the door, and said door engaging one side of the loop to hold the door in a predetermined position.

In testimony that I claim the foregoing as my own, I have hereto affixed my signature.

FREDERICK W. FRENCH.